United States Patent [19]

Wemhöner

[11] 4,388,144

[45] Jun. 14, 1983

[54] RAPID-CYCLE PRESS

[75] Inventor: Heinrich Wemhöner, Herford, Fed. Rep. of Germany

[73] Assignee: Heinrich Wemhöner GmbH & Co. KG, Herford, Fed. Rep. of Germany

[21] Appl. No.: 245,113

[22] Filed: Mar. 18, 1981

[30] Foreign Application Priority Data

Aug. 22, 1980 [DE] Fed. Rep. of Germany ....... 3031683

[51] Int. Cl.[3] ........................ B30B 1/00; B32K 31/00; B23K 27/00

[52] U.S. Cl. .................................... 156/538; 156/580; 100/215; 100/218; 414/19

[58] Field of Search ............... 156/558, 566, 391, 539, 156/583.1, 584, 598, 538, 580; 100/183, 218, 215, 188 R, 189; 414/19, 667, 668; 118/121

[56] References Cited

U.S. PATENT DOCUMENTS

| | | | |
|---|---|---|---|
| 3,927,612 | 12/1975 | Friz et al. | 100/218 |
| 4,081,085 | 3/1978 | Haenni | 414/19 |
| 4,253,891 | 3/1981 | Brussel | 100/218 |

FOREIGN PATENT DOCUMENTS 1911764 9/1971 Fed. Rep. of Germany .

*Primary Examiner*—Edward C. Kimlin
*Assistant Examiner*—Louis Falasco
*Attorney, Agent, or Firm*—Max Fogiel

[57] ABSTRACT

A press for coating workpieces has an upper and a lower press plate which can move together and apart. After workpieces are coated and the press opens, they rest on the lower plate from which they are removed. For this purpose an edge portion of the workpieces is lifted by suction members and one or more bars are moved underneath the workpiece which, resting thereon, is then moved out from between the press plates.

7 Claims, 3 Drawing Figures

RAPID-CYCLE PRESS

BACKGROUND OF THE INVENTION

The present invention relates to a press in general, and more particularly to a rapid-cycle press.

Still more particularly, the invention relates to a rapid-cycle press for coating sheets, panels and similar workpieces.

Generally speaking, presses of this type have an upper and a lower press table which can be moved apart so that a workpiece can be placed between them. Thereupon the press plates are moved together to exert pressure upon the workpiece and they are then moved apart again. Presses of this type are widely used to coat panels and similar workpieces, such as chipboard panels, with any of a variety of surfacing materials. For example, melamine films or films on the basis of phenyolic resin or the like are applied in this manner under the influence of heat and pressure to the surfaces of such panels.

A press of this type is known from German Pat. No. 1,911,764, which discloses that the workpieces can be introduced into the press gap, i.e. the space between the two press plates when the press is open, by means of roller-belt conveyors, and the finished workpieces are removed from this gap with the aid of transporting frames having suction elements thereon. The workpieces to be processed in these presses are usually of relatively large dimensions which means that the transporting frames must have a rather large number of such suction elements and this in turn requires a rather substantial mechanical expenditure as well as the expenses for providing control equipment which controls the operation of these suction elements. Particularly, the expenses of the control equipment increase the price of the press very substantially and thus commensurately decrease the economy involved in its acquisition and operation.

In view of this it has been proposed to simplify the removal of the finished workpieces from these presses by just not lifting the finished workpieces off the lower press plate, but pulling or pushing the finished workpiece out of the opened press and letting it slide along on the lower press plate. Unfortunately, this results very quickly in the formation of the sided tracks in the highly polished surface of the lower press plate so that either the entire lower press plate, or at least that portion of it provided with the highly polished surface, quickly becomes unusable and must be replaced.

SUMMARY OF THE INVENTION

Accordingly, it is an object of the present invention to overcome the disadvantages of the prior art.

A more particular object of the invention is to provide a rapid-cycle press of the type in question in which the construction of the device for removing the finished workpieces is greatly simplified and reduced in cost, but without having to accept the disadvantages which result in the prior art if the workpieces are simply pushed out of the press sliding on the upper surface of the lower press plate.

In pursuance of these objects, and of others which will become apparent hereafter, one feature of the invention resides in a press for coating sheets, panels and similar workpieces which, briefly stated, may comprise an upper and a lower press plate one of which is mounted for vertical movement relative to the other between a pressing position and a workpiece feeding into a moving position in which the plates form with one another a gap. Lifting means are provided for engaging an edge portion of a finished workpiece resting on the lower press plate when the one plate is in the removing position and for lifting such edge portion. Means are provided for inserting at least one supporting bar from the lifted edge portion underneath the workpiece, and final means are provided for removing the workpiece supported on the bar, from the gap.

A press constructed in accordance with the invention has the advantage that the device for removing the finished workpieces is exceedingly simple and inexpensive in its construction, as compared to similar devices known from the prior art. This is of particular advantage if such a press is used by smaller manufacturers or in small shops where the possibilities for economically utilizing expensive presses are often greatly limited, whereas a more reasonably priced piece of equipment can be more easily afforded. Moreover, due to the fact that the workpieces are moved out of contact with the lower press plate before they are removed from the gap between the lower and upper plates, none of the disadvantages residing in the prior-art removal by pushing the workpieces out along the surface of the lower plate, are to be found in the press acoording to the present invention. In other words, no tracks form in the surface of the lower plate.

The invention will hereafter be described with reference to an exemplary embodiment. It should be understood, however, that this is by way of explanation only and is not to be considered limiting.

DESCRIPTION OF THE PREFERRED EMBODIMENTS

Figure 1:
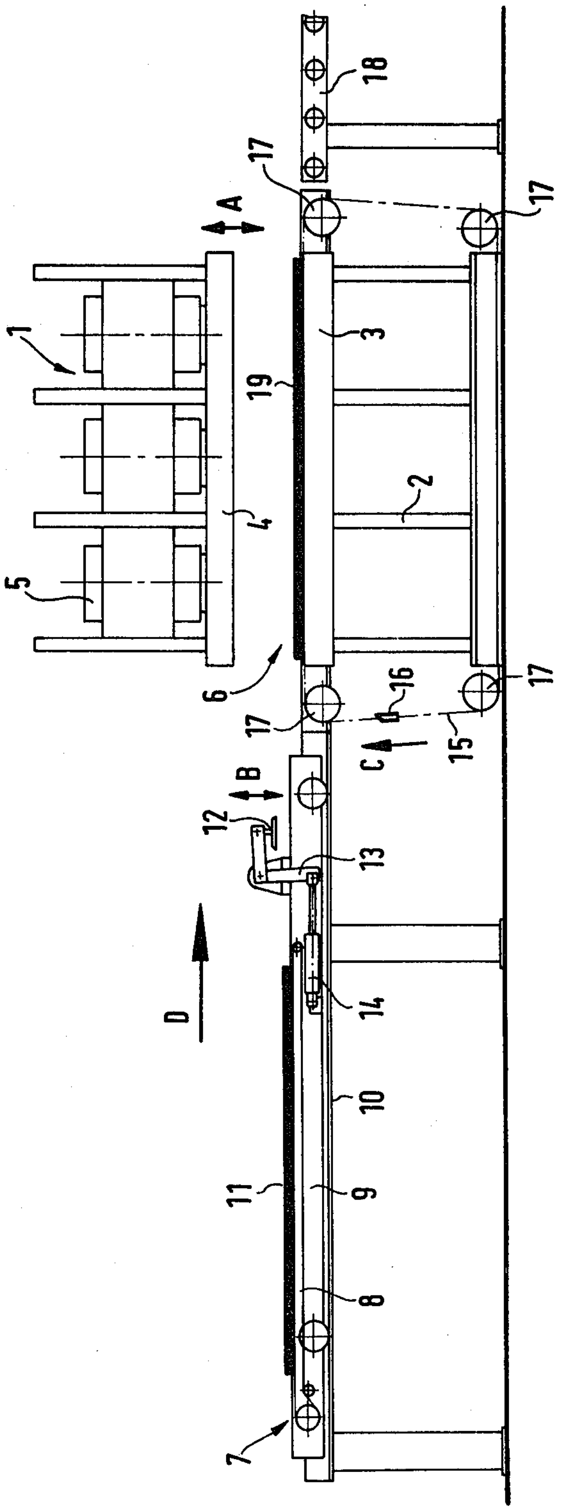
FIG. 1 is a somewhat diagrammatic side view of a press embodying the present invention, shown with the press having been opened subsequently to processing of a workpiece.
Figure 2:
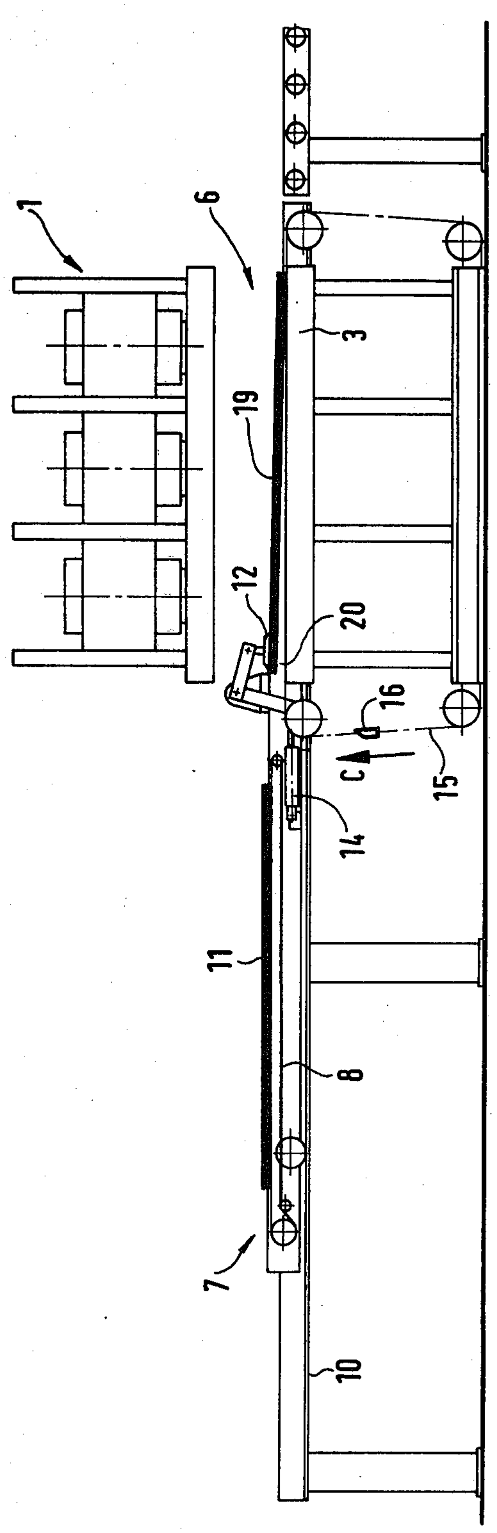
FIG. 2 is a view similar to FIG. 1, showing the press in a subsequent operating state.
Figure 3:
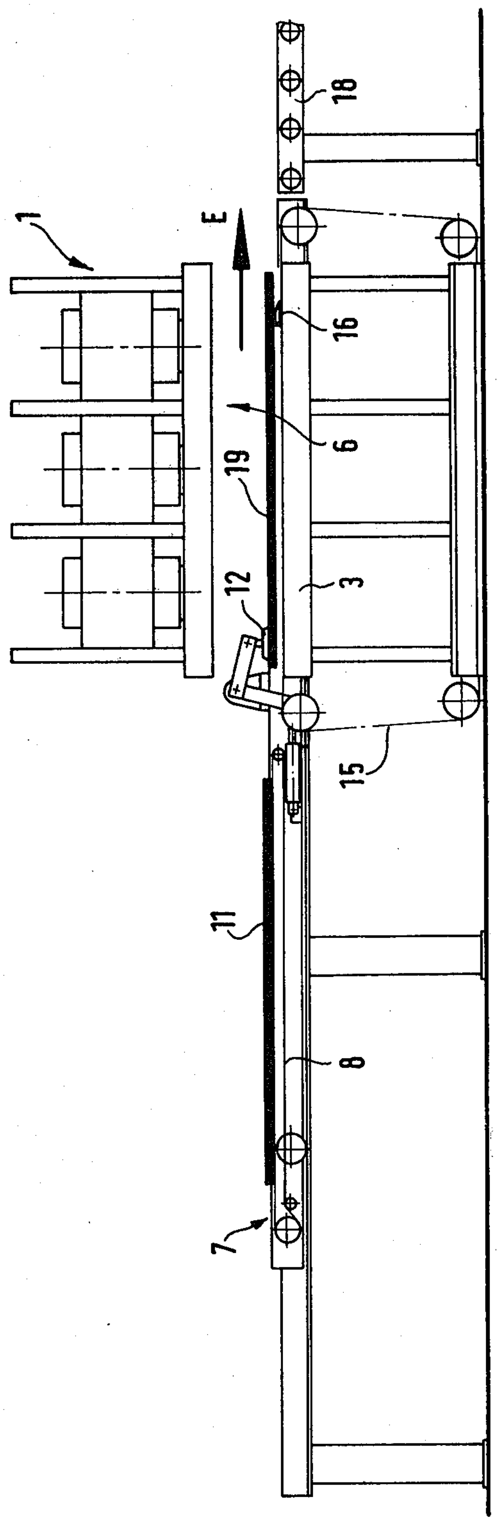
FIG. 3 is another view similar to FIGS. 1 and 2 but showing the press in a position in which the workpiece support moves underneath the workpiece preparatory to the removal of the workpiece from the press.

The press shown in FIGS. 1–3 is identified overall with reference numeral 1 and has uprights 2 on which a lower press plate 3 is mounted. Above the lower press plate 3 there is an upper press plate 4 which can be raised and lowered in the direction of the double-headed arrow A with the aid of fluid operated cylinder and piston units 5. When the upper press plate 4 is lifted off the lower press plate 3, as shown in FIG. 1, the two plates define with one another a gap 6 into which the workpieces to be processed can be inserted and from which the processed finished workpieces must be removed.

Workpieces are supplied to the press 1 by means of a conventional feeding device 7 composed of a roller band conveyor 8 and the frame 9 thereof. This can be moved into the gap 6 on rails 10 which are mounted laterally of the press 1 in order to deposit the workpiece 11 on the lower press plate 3 after the workpiece 11 has been received by the roller band conveyor 8.

To remove finished workpieces from the press 1 the frame 9 of the device 7 is provided with suction elements 12 which are known per se from the art and which can be vertically moved in the direction of the double-headed arrow B by a cylinder and piston unit 14, via an articulated linkage 13. In addition, a supporting bar or rod 16 is provided (there may be more than one) which extends transversely to the gap 6 and the ends of which are connected to endless transporting elements 15 which are located at opposite lateral sides of the gap 6 and which advance in an endless path at these opposite lateral sides. The transporting elements 15 may e.g. be endless chains or the like, and are guided by several reversing rolls 17 which are associated with the press 1, as shown in FIGS. 1–3. Finally, a roller table 17 is arranged subsequent to the press for receiving the finished workpieces and conveying them onto another destination which is of no importance for purposes of the present invention; the height of the roller table 18 corresponds to the height of the lower press plate 3.

The operation with which the invention is concerned, i.e. the removal of finished workpieces from the press 1, begins with the position shown in FIG. 1 in which the upper press plate 4 has been raised by the cylinder and piston units 5 in the direction of the arrow A so that it forms a gap 6 with the lower press plate 3. The workpiece 19, which has been treated by coating it or otherwise processing it, now rests on the lower press plate 3. Now the device 7 is advanced on the rails 10 in the direction of the arrow D into the gap 6 until the suction elements 12 are located above the front edge portion (i.e. the left-hand edge portion in FIG. 1) of the finished workpiece 19 whereupon they are lowered by the cylinder and piston unit 14 until they come to rest upon this edge portion of the workpiece 19. The suction exerted by the elements 12 now lifts the workpiece 19 to the inclined position shown in FIG. 2 when the cylinder and piston unit 14 is again operated.

This results in the formation of a gap 20 between the left-hand edge of the workpiece 19 and the upper surface of the lower press plate 3. Now the transporting elements 15 introduce (in the course of their movement) the supporting rod 16 into this gap and the rod 16 moves underneath the workpiece 19 in the manner shown in FIG. 3 until the workpiece 19 in the gap 6 is supported at the left-hand edge portion by the suction elements 12 and at the right-hand edge portion by the supporting rod 16. It can now be transported in the direction of the arrow E, i.e. out of the gap 6 and onto the roller table 18. The next, as yet unprocessed workpiece 11 which is resting on the roller-band conveyor 8 of the unit 7 while the finished workpiece 19 is being removed from the gap 6, can now be introduced into the gap 6, the unit 7 be retracted from the gap and the press closed for the next operation.

To assure that neither the sensitive surface of the lower press plate 3 nor the underside of the finished workpiece 19 will become damaged, it is advisable if the supporting rod 16 is provided with a protective cover of some type, for example a surface layer of felt or another suitable material, among which is polytetrafluoroethylene. Also, the movement of the supporting bar 16 underneath and along the underside of the workpiece 19 is facilitated if the supporting bar 16 is of conical or wedge-shaped cross section in the direction of its advancement (arrow C) as shown in the drawing, or else if it is of essentially circular cross section and can be rolled.

The invention is susceptible of various modifications which are intended to be encompassed within the scope of the appended claims. For example, suction elements 12 could be mounted so as to be horizontally moveable independently of the unit 7 in the transport direction E of the finished workpieces 19. They could then also be introduced into the gap 6 from the opposite side, i.e. from the side opposite at which the unit 7 enters. Evidently, the supporting bar 16 can also enter from the same side, i.e. again from the side opposite that at which the unit 7 enters. Such a separation is possible, but constitutes a less advisable modification because it would be more complicated and hence more expensive, and would require special control devices to control the movements of the suction elements 12. It is also possible to so mount the single or plurality of supporting bars 16 that they are arranged laterally of the gap 20 and can be pivoted into the gap, or that they are arranged adjacent a longitudinal end of the press and can be pivoted into the gap from that position. Particularly in connection with this pivoting possibility it is worth mentioning that the workpiece 19 could then be engaged by suction elements 12 not on one of its transverse edges, but along one of its longitudinal edges to lift it off the lower press plate 3.

While the invention has been described with reference to a specific embodiment illustrated in the drawings, it is to be understood that this is not to be considered limiting but only to be considered for purposes of explanation of the invention, and that any and all modifications which may be considered within the skill of the art are intended to be encompassed within the appended claims.

What is claimed is:

1. In a press for coating sheets, panels and similar workpieces, a combination comprising an upper and a lower press plate one of which is mounted for vertical movement relative to the other between a pressing position and a workpiece feeding and removing position in which the plates form with one another a gap; lifting means comprising a suction member for engaging an edge portion of a finished workpiece resting on the lower press plate such that when the one plate is in said removing position the said lifting means lifts such edge portion; means for inserting at least one supporting bar at said lifted edge portion underneath the workpiece; means for removing the workpiece supported on said bar, from said gap; means mounting said lifting means for horizontal movement relative to said gap; and means for feeding workpieces into the gap and having a carriage; said mounting means being located on said carriage; said lifting means and said supporting bar comprising a combination for cooperatively removing a finished workpiece.

2. A press as defined in claim 1; and further comprising endless transporting elements mounted for advancement adjacent opposite sides of said gap, said at least one support for being connected to said transporting elements for movement therewith.

3. A press as defined in claim 1; and further comprising means mounting said at least one supporting bar for pivotal movement into and out of said gap.

4. A press as defined in claim 1; and further comprising protective covering means on said at least one supporting bar for protecting said workpieces and said lower press plate against damage due to contact with the bar and with one another.

5. A press as defined in claim 1, said at least one supporting bar being movable out of said gap in a predetermined direction, and having a cross section which is conical in said direction.

6. A press as defined in claim 1, said supporting bar being rollable into and out of said gap.

7. A press as defined in claim 1, further comprising endless transporting elements mounted for advancement adjacent opposite sides of said gap, said at least one support bar being connected to said transporting elements for movement therewith; means mounting said at least one supporting bar for pivotal movement into and out of said gap; protective covering means on said at least one supporting bar for protecting said workpieces and said lower press plate against damage due to contact with the bar and with one another; said at least one supporting bar being movable out of said gap in a predetermined direction, and having a cross section which is conical in said direction.

* * * * *